United States Patent [19]

Bielawski et al.

[11] Patent Number: 5,599,382
[45] Date of Patent: Feb. 4, 1997

[54] ENHANCED HEAT EXCHANGER FLUE GAS TREATMENT USING STEAM INJECTION

[75] Inventors: Gregory T. Bielawski, Wadsworth; Dennis W. Johnson, Barberton; Robert B. Myers, Norton, all of Ohio

[73] Assignee: The Babcock & Wilcox Company, New Orleans, La.

[21] Appl. No.: 459,592

[22] Filed: Jun. 2, 1995

Related U.S. Application Data

[62] Division of Ser. No. 304,741, Sep. 12, 1994.

[51] Int. Cl.⁶ ..................................... B01D 5/00
[52] U.S. Cl. .............. 95/288; 55/222; 55/257.7; 55/263; 55/269; 422/173
[58] Field of Search .................. 55/222, 257.7, 55/259, 263, 268, 269; 95/288; 165/113, 119, 913; 422/169, 173; 423/210

[56] References Cited

U.S. PATENT DOCUMENTS

| | | | |
|---|---|---|---|
| 701,898 | 6/1902 | Larson | 55/263 |
| 1,563,125 | 11/1925 | Ward | 55/263 |
| 2,967,588 | 1/1961 | Swart | 55/263 |
| 4,263,021 | 4/1981 | Downs et al. | 55/73 |
| 4,339,249 | 7/1982 | Berkestad et al. | 55/269 |
| 4,345,916 | 8/1982 | Richards et al. | 55/263 |
| 4,487,139 | 12/1984 | Warner | 110/345 |
| 4,557,202 | 12/1985 | Warner | 110/216 |
| 4,705,101 | 11/1987 | Warner | 165/104.31 |
| 4,735,636 | 4/1988 | Roberts | 55/222 |
| 4,818,256 | 4/1989 | Ross | 55/263 |
| 5,176,723 | 1/1993 | Liu et al. | 55/90 |
| 5,246,471 | 9/1993 | Bhat et al. | 55/223 |
| 5,368,096 | 11/1994 | Williams | 55/268 |

OTHER PUBLICATIONS

"Utility Seeks to Integrate Heat Recovery, Flue Gas Treatment", Power, May 1993.

Babcock & Wilcox White Paper on Condensing Heat Exchangers, 1993.

Jinjun Sun, et al "A Method to Increase Control Efficiencies of Wet Scrubbers for Submicron Particles and Particulate Metals," Air & Waste, Feb., 1994, vol. 44.

J. G. Noblett Jr., et al, "Control of Air Toxics From Coal Fired Power Plants Using FGD Technology," EPRI Symposium On $SO_2$ Control, 1993, Boston.

"Flux–Force/Condensation Scrubbing System Controls Emissions From Medical Waste Incenerator," The Air Pollution Consultant, Nov./Dec. 1993.

The McIlvaine Scrubber Manual, vol. IV, Chapter 2.4 Mist Eliminators, pp. 124.481–124.495.

Scrubber Generated Particulate Literature Survey–EPRI Report CS–1739, Mar. 1981.

Entrainment Separators for Scrubbers–Seymour Calvert, et al.–EPA Report 650/2–74–119a, Oct. 1974.

P. A. Bhat, et al. "Results of Particulate and Gaseous Sampling From a Wet Scrubber Pilot Plant" Presented EPRI Sym. 4/5–8.

Primary Examiner—C. Scott Bushey
Attorney, Agent, or Firm—Daniel S. Kalka; Robert J. Edwards

[57] ABSTRACT

A two-stage flue gas treatment condensing heat exchanger system allows for flue gas to be passed into a two-stage housing at an inlet of the housing. The flue gas is channeled downwardly through a first stage of the housing having a first condensing heat exchanger which cools the flue gas. The flue gas is then upwardly channeled in the housing through a second stage having a second condensing heat exchanger which is located near an outlet. A collection section is located between the first stage and the second stage of the housing for collecting liquids, condensate, particulate and reaction product. Steam is injected into the housing at a plurality of locations for enhancing particulate removal.

5 Claims, 3 Drawing Sheets

ENHANCED HEAT EXCHANGER FLUE GAS TREATMENT USING STEAM INJECTION

This is a divisional of application Ser. No. 08/304,741 filed Sep. 12, 1994.

BACKGROUND OF THE INVENTION

1. Field of the Invention

The present invention relates, in general, to the treatment of flue gas, and, in particular, to a new and useful method to recover useful heat and an enhanced method for removing particulates (fly ash), sulfur oxides/acid gases and other contaminants contained in flue gases formed during the combustion of waste materials, coal and other fossil fuels, which are burned by electric power generating plants, process steam production plants, waste- to-energy plants and other industrial processes through the use of a two-stage downflow flue gas treatment condensing heat exchanger with steam injection.

2. Description of the Related Art

In the power generating field, there are several known devices and methods which relate to the integrated heat recovery and pollutant removal of particulate, sulfur oxides and/or contaminants from a hot combustion exhaust gas for complying with federal and state emissions requirements.

One device which has been used is a condensing heat exchanger, as shown in FIG. 1, which recovers both sensible and latent heat from flue gas 11 in a single unit 10. The device allows for the gas 11 to pass down through a heat exchanger 12 while water 14 passes upward in a serpentine path through the tubes of heat exchanger 12. Condensation occurs within the heat exchanger 12 as the gas temperature at the tube surface is brought below the dew point. The condensate falls as a constant rain over the tube array of heat exchanger 12 and is removed at the bottom by condensate drain 16. Gas cleaning may occur within the heat exchanger 12 by means of absorption, condensation and impaction as the gas is cooled below the dew point as the particulate impact the tubes.

The heat exchanger tubes and inside surfaces of the heat exchanger shell are made of corrosion resistant material or are covered with Teflon in order to protect them from corrosion when the flue gas temperature is brought below the acid dew point. Interconnections between the heat exchanger tubes are made outside of the tube sheet and are not exposed to the corrosive flue gas stream 11.

Another device used in this area is an integrated flue gas treatment (IFGT) condensing heat exchanger 20, schematically shown in FIG. 2, which is a condensing heat exchanger designed to enhance the removal of pollutants, particulate, sulfur oxides/acid gases and other contaminants from flue gas stream 22. It is also made of corrosion resistant material or has all of the inside surfaces covered by Teflon. There are four major sections of the IFGT 20: a first heat exchanger stage 24, an interstage transition region 26, a second heat exchanger stage 28, and a mist eliminator 30. The major differences between the integrated flue gas treatment design of FIG. 2 and the conventional condensing heat exchanger design of FIG. 1 are:

1. the integrated flue gas treatment design uses two heat exchanger stages 24 and 28 instead of one heat exchanger 12 (FIG. 1);
2. the interstage of transition region 26, located between heat exchanger stages 24 and 28, is used to direct the gas 22 to the second heat exchanger stage 28, and acts as a collection tank and allows for treatment of the gas 22 between the stages 24 and 28;
3. the gas flow in the second heat exchanger stage 28 is upward, rather than downward;
4. gas outlet 29 of the second heat exchanger stage is equipped with an alkali reagent spray system, generally designated 40, comprising reagent source 42 with a pump 44 for pumping reagent 42 to sprayers 46; and
5. the mist eliminator 30 is used to separate the water formed by condensation and sprays from the flue gas.

Most of the sensible heat is removed from the gas 22 in the first heat exchanger stage 24 of the IFGT 20. The transition region 26 can be equipped with a water or alkali spray system 48. The system 20 saturates the flue gas 22 with moisture before it enters the second heat exchanger stage 28 and also assists in removing particulate, sulfur pollutants, acid gases and other contaminants from the gas 22.

The transition piece 26 is made of corrosion resistant material like fiberglass-reinforced plastic. Additionally, the second heat exchanger stage 28 is operated in the condensing mode, removing latent heat from the gas 22 along with pollutants. Also, the top of the second heat exchanger stage 28 is equipped with an alkali solution spray device 46. The gas 22 in this stage 28 is flowing upward while the droplets in the gas 22 fall downward. This counter-current gas/droplet flow provides a scrubbing mechanism that enhances particulate and pollutant capture. The captured particulate, sulfur oxides/acid gases and contaminants that are contained in the falling condensate/reacted alkali droplets flow downward and are collected at the bottom of the transition section 26. The flue gas outlet 29 of the IFGT 20 is equipped with the mist eliminator 30 to reduce the chance of moisture carryover.

SUMMARY OF THE INVENTION

The present invention is a two-stage downflow flue gas treatment condensing heat exchanger system which utilizes a housing having an inlet and an outlet. Flue gas enters the housing at the inlet and travels downwardly through the housing. Art upper stage beneath the inlet contains a first condensing heat exchanger and withdraws heat from the flue gas in order to cool the flue gas as the flue gas is channeled downwardly through the housing. A second stage contains a second condensing heat exchanger which provides a further cooling of the flue gas by withdrawing more heat from the flue gas as the flue gas passes upwardly through the second stage toward the outlet. A collection stage is located between the first heat exchanger and the second heat exchanger for collecting condensate, liquid, particulate and reaction product. Steam is injected at a plurality of locations such as the inlet, the first heat exchanger, the collection stage and the second heat exchanger for increasing condensate loading for enhancing particulate collection.

A mist eliminator is located at the outlet for demisting the flue gas prior to its exit through the outlet. A reagent spray system is located at the second stage for spraying the flue gas with an alkaline reagent spray.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

The present invention provides an improved system and method to further enhance the removal of particulate (fly ash), sulfur oxides/acid gases and other contaminants from a flue gas stream produced by the combustion of waste materials, coal, oil and other fossil fuels which are burned by power generating plants, process steam production plants, waste-to-energy plants and other industrial processes through the injection of steam.

Figure 1:
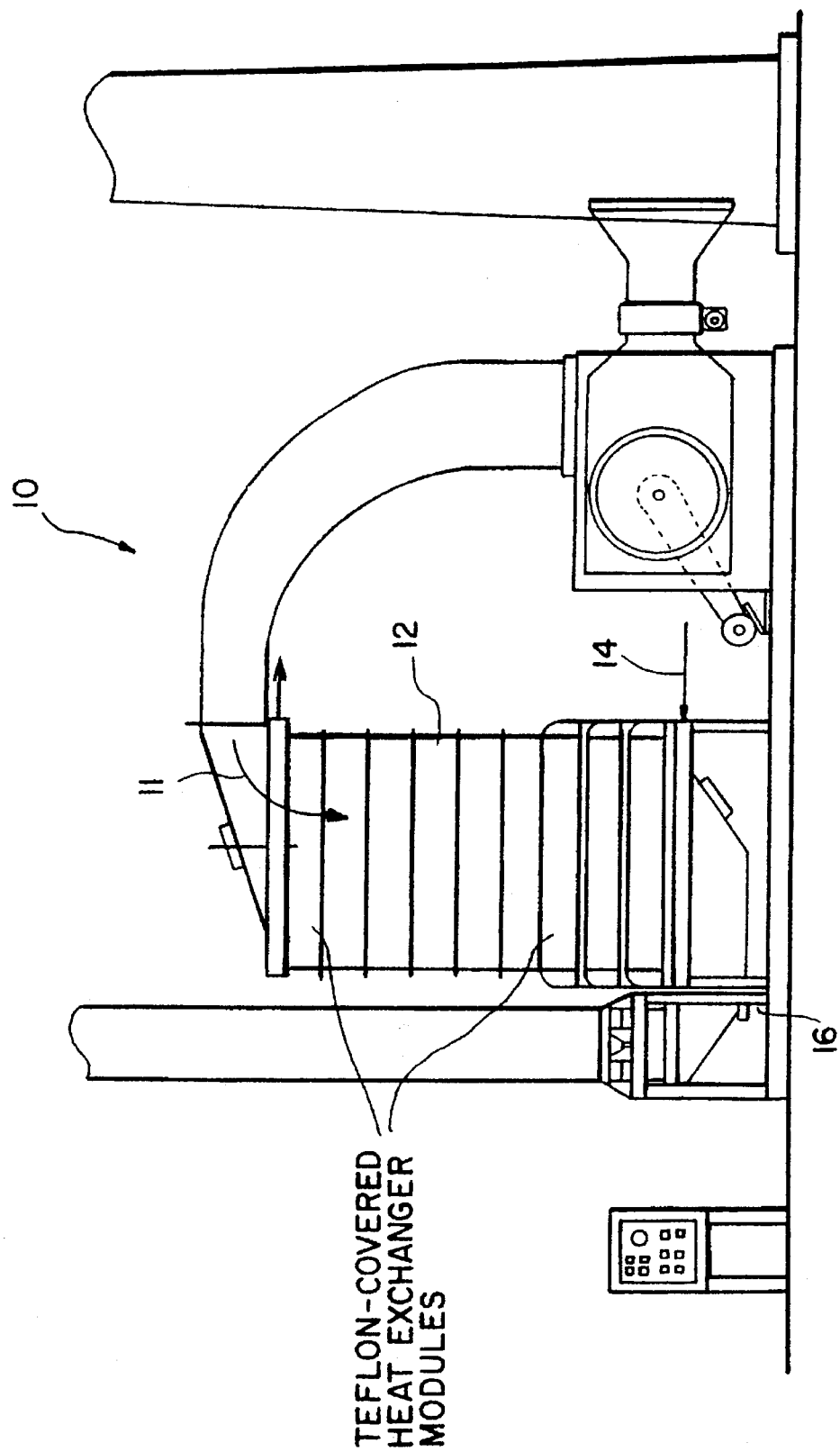
FIG. 1 is a schematic view illustrating one known condensing heat exchanger.
Figure 2:
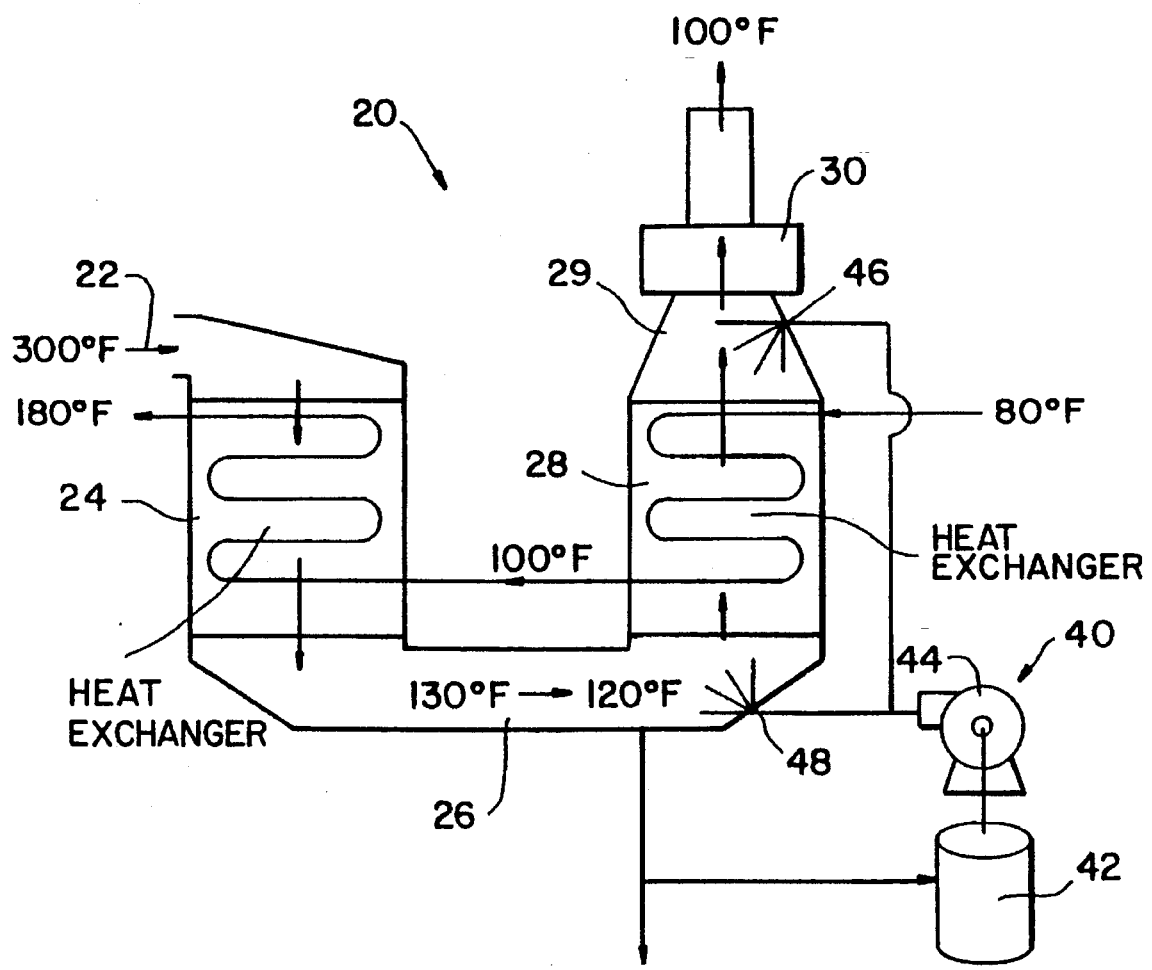
FIG. 2 is a schematic view illustrating a second type of known condensing heat exchanger.

The same reference numerals are used to designate the same or similar features of the system of FIG. 2.

Figure 3:
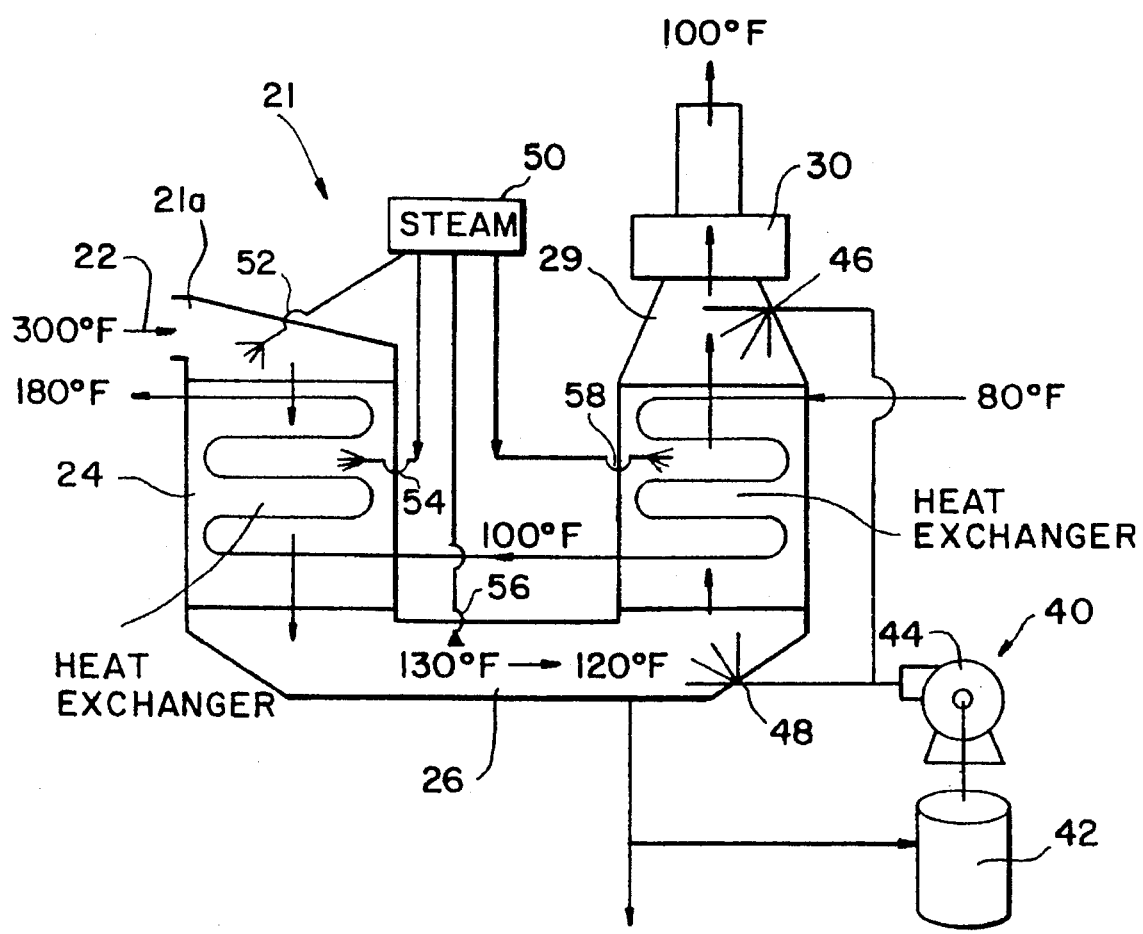
FIG. 3 is a schematic view illustrating an integrated flue gas treatment condensing heat exchanger with steam injection according to the present invention.

The system according to the present invention utilizes an IFGT, generally designated 21, having two condensing heat exchanger stages 24 and 28 connected in series by interstage transition section 26 wherein steam 50 is injected into unit 21 at one or more locations, i.e injection ports 52, 54, 56 and 58 as shown in FIG. 3. The interstage transition 26 permits the vertical downflow of flue gas 22 through the first heat exchanger stage 24 followed by vertical upflow of the flue gas 22 through the second heat exchanger stage 28.

Flue gas enters the top of the unit 21 at inlet 21a to the first heat exchanger stage for cooling the gas 22 and flows downwardly through the heat exchanger 24. The first heat exchanger stage 24 is operated in the condensing mode removing both sensible and latent heat from the flue gas 22. As the flue gas 22 is cooled to below its dew point, condensation of water vapor and/or other contaminants in the vapor state begins to takes place, resulting in droplet formation that aids in the removal of particulate and soluble pollutants. The larger condensate droplets formed in the first heat exchanger stage 24 by the mechanisms of condensation and impaction fall downward and are separated from the gas stream 22 by the combined effects of gravitational and inertial forces as the gas 22 is discharged into the interstage transition 26. These larger droplets are collected at the bottom of the interstage transition 26.

The flue gas 22 containing entrained droplets (i.e. mist) flows through the interstage transition 26 and is directed upward through the second heat exchange stage 28 for further cooling of the gas 22 where additional condensation and contaminant removal occurs. The alkali reagent spray 42 may be injected into the gas stream 22 at the second heat exchanger stage inlet and/or outlet to promote the removal of sulfur oxides/acid gases and other contaminants.

The large droplets produced by the condensate formation, impaction and/or the alkali reagent sprays flow downward by gravity through the second heat exchange stage 28 and are collected at the bottom of the interstage transition 26.

Injection of the steam 50 at injection port 52 near the inlet 21a, at injection port 54 at the first heat exchanger 24, at injection port 56 at the interstage transition 26 and at injection port 58 at the second heat exchanger 28 increases the condensate loading on the down stream heat exchange surfaces. The increased condensate loading resulting from the injection of the steam 50 further enhances the capture of particulate, sulfur oxides/acid gases and other contaminants over that of the known systems.

Advantages of the present invention are listed below as follows:

1. The addition of steam increases the condensate loading of the system, further enhancing particulate removal.
2. Nearly 100% of the heat energy added to the flue gas through the injection of steam can be recovered and returned back to the system. In a conventional boiler feed water heating cycle, the recovered heat transferred to the fluid flowing through the tubes is used to make the steam needed for injection.
3. Additional condensation promotes removal of fine particulate and aerosols by direct condensation and impaction.
4. The additional condensation increases the water loading on the tube surfaces to aid in keeping the surfaces clean.
5. The additional condensate loading on the heat exchange surfaces results in increased gas-liquid contact to further enhance the removal capabilities of soluble gaseous pollutants.
6. The water content of the exiting flue gases are not significantly changed.
7. The additional condensation increases the heat transfer rate between the gas and the fluid in the tubes.

While specific embodiments of the invention have been shown and described in detail to illustrate the application of the principles of the invention, it will be understood that the invention may be embodied otherwise without departing from such principles.

What is claimed:

1. A method for treating a flue gas, comprising the steps of:

passing a flue gas into a two-stage housing at an inlet of the housing;

channeling the flue gas downwardly through first heat exchanger means at a first stage of the housing for cooling the flue gas;

channeling the flue gas upwardly through second heat exchanger means at a second stage of the housing for further cooling the flue gas;

collecting liquids and particulate between the first stage and the second stage of the housing;

positioning at least two steam injection ports for increasing condensate loading on the first and second heat exchanger means in the housing, the first steam injection port being positioned in the inlet of the housing prior to the first heat exchanger means, the second steam injection port being positioned in the first heat exchanger means;

injecting steam into the housing; and exiting the flue gas from the housing at an outlet near the second stage of the housing.

2. The method according to claim 1, further comprising the step of removing mist from the flue gas.

3. The method according to claim 2, further comprising the step of including cleaning the flue gas with a reagent.

4. The method according to claim 1, wherein the positioning step includes positioning a third steam injection port in a transition section connecting the first and second stages of the housing.

5. The method according to claim 4, wherein the positioning step includes positioning a fourth steam injection port in the second heat exchanger means.

* * * * *